H. E. WARREN.
SELF STARTING SYNCHRONOUS MOTOR.
APPLICATION FILED FEB. 2, 1918.

1,390,319.

Patented Sept. 13, 1921.

INVENTOR.
Henry E. Warren
BY Jas. H. Churchill
ATTORNEY.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SELF-STARTING SYNCHRONOUS MOTOR.

1,390,319.  Specification of Letters Patent.  Patented Sept. 13, 1921.

Application filed February 2, 1918. Serial No. 215,028.

*To all whom it may concern:*

Be it known that I, HENRY E. WARREN, a citizen of the United States, and a resident of Ashland, in the county of Middlesex and State of Massachusetts, have invented an Improvement in Self-Starting Synchronous Motors, of which the following description, in connection with the accompanying drawings, is a specification, like characters on the drawings representing like parts.

This invention relates to self-starting synchronous motors for use on alternating current systems, and has for its object to provide a simple and efficient motor having a rotor which is capable of starting into rotation at certain values of voltage and frequency and not at other values.

To this end, the self-starting synchronous motor is provided with means for producing a pulsating or so called rotating magnet field, and with a rotor which is capable of oscillating or vibrating in unison with the alternations of the field in starting and then of rotating in one direction under the influence of said field, when the amplitude of the said oscillations bring the rotor into rotary synchronism with the magnetic field of said motor.

The particular features of the invention will be pointed out in the claims at the end of this specification.

Figure 1:
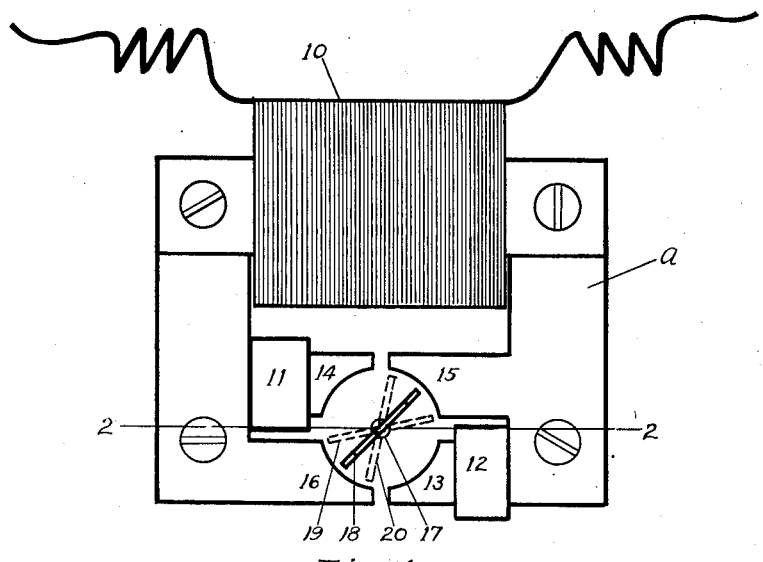
Figure 2:
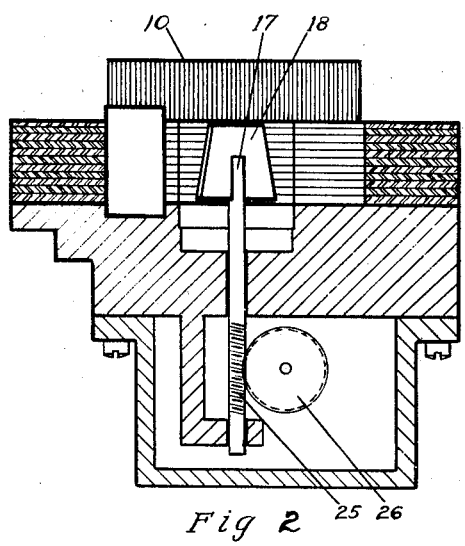

Figure 1 is a plan of one form of self-starting synchronous motor embodying this invention, and Fig. 2, a vertical section on the line 2—2, Fig. 1.

In the present instance I have illustrated the invention as embodied in one form of self-starting synchronous motor, in which a bi-polar field magnet $a$ constituting the stator for the motor is provided with an energizing coil 10, and with shading coils 11, 12, for causing a time lag of the magnetic intensity in the pole-faces, and 14 behind that in the pole-faces 15 and 16, so as to produce a pulsating or so called rotating magnetic field with elliptical characteristics about the shaft 17, upon which is mounted a rotor 18, preferably consisting of one or more thin flat bars or pieces of hardened steel, vertically arranged edge on with respect to the shaft 17 and forming a polar rotor.

The rotor 18 may be rectangular in its vertical plane but it may and preferably will be made in the form of a trapezoid as shown in Fig. 2, for the purpose of better supporting the vertical shaft 17 by means of the magnetic force acting upon the rotor.

The magnetic force due to an alternating current flowing through the energizing coil 10, would ordinarily cause the rotor 18 to take up the position shown by the heavy full lines in Fig. 1. There is however a tendency for the rotor to vibrate or oscillate more or less about this position, due to the fact that the maximum intensity of the magnetic field is passing alternately from one pair of pole-faces 13 and 14, to the other pair 15 and 16. This tendency to oscillate or vibrate is utilized by me, in starting the rotor, and by designing and making the rotor 18 of the proper dimensions, especially as to thickness and length, conditions are brought about, where the natural period of vibration or oscillation of the rotor, which is a function of its moment of inertia about the shaft 17, its magnetic qualities and the strength of the magnetic force going alternately through the pole-faces 13, 14 and 15, 16, shall correspond approximately with the frequency of the current passing through the coil 10. When this condition of resonance occurs, the rotor 18 will rapidly increase its arc of vibration or oscillation, as indicated by the dotted lines 19—20, until it swings at times practically at right angles to the direction of the magnetizing forces. When this condition occurs, the rotor will instantly fall into step with the rotation of the magnetic field, and will then rotate continuously in one direction in rotary synchronism with the magnetic field and in synchronism with the alternating current. In order to secure resonance with a given rotor, there must be a definite relation between the strength of the current flowing through coil 10 and the frequency. If the frequency remains constant, resonance will not occur and the rotor will not therefore be self-starting, if the current passing through coil 10 is considerably weaker or stronger than its true value. If, however, the rotor is once in synchronism, much greater variations in current strength through coil will not interfere with its continuous operation. In a motor of this type resonance will occur and the same rotor will be self-starting in a lower frequency if the current through coil 10 is correspondingly lowered, and conversely for a higher frequency it is necessary that there should be a strong current through coil 10. It therefore becomes possible by changing the number of turns of coil 10 or by other equivalent means to use the same rotor at different frequencies. I find that sufficiently exact resonance to make the motor self-starting is obtained to cover all ordinary fluctuations in frequency and voltage which occur in commercial lighting circuits without special adjustment of the motor, but a motor designed to operate on a 60 cycle circuit at 110 volts might fail to start on a 40 cycle circuit at the same voltage.

The self-starting synchronous motor herein shown may be used for various purposes and in the present instance, the rotor shaft 17 is shown as provided with a worm 25 for driving a worm gear 26.

Furthermore, the motor herein shown is especially designed to operate as a single phase motor but it is not desired to limit the invention in this respect.

I have herein shown one construction of rotor which I may prefer, and as I believe myself to be the first to produce a self-starting synchronous motor for alternating current, having a polar rotor which has a natural frequency of oscillation resonant to the frequency of the alternating current and capable of oscillating in starting and then of rotating in one direction, I do not desire to limit the invention to the particular construction of rotor herein shown.

Claims—

1. In a self-starting motor for alternating current, means for producing a pulsating magnetic field having rotary characteristics, and a rotor capable of strongly resonant vibration under the influence of the field magnetism.

2. In a self-starting synchronous motor, means for producing a pulsating rotating magnetic field, and a tuned rotor capable of vibratory response to the pulsations of the field magnetism up to the point where the amplitude of vibrations brings the rotor into rotary synchronism with the field.

3. A self-starting alternating current synchronous motor comprising a stator provided with an alternating current exciting winding, and a polar rotor which has a natural frequency of oscillation resonant to the frequency of said alternating current.

4. A self-starting synchronous alternating current motor having a rotor constructed and designed to oscillate in starting and to rotate continuously in one direction when the amplitude of the oscillations brings the rotor into rotary synchronism with the field of the motor.

5. A self-starting synchronous alternating current motor having means for producing a rotating magnetic field, and a rotor capable of oscillating in starting and then of rotating continuously in one direction under the influence of said field.

6. A self-starting synchronous alternating current motor comprising means for producing an alternating field magnetism, and a rotor constructed and arranged in said field to vibrate sympathetically in unison with the alternations of said field to start the rotor in motion and to bring it into synchronous rotation with said field and effect rotation of the rotor in one direction while in synchronism with said field.

7. A self-starting motor for alternating current having a rotor responsive only to definite values of frequency and voltage of said alternating current.

8. A rotor for an alternating current motor constructed and designed to be capable of starting into rotation at definite predetermined values of voltage and frequency of said current, and of failing to start into rotation at values above and below said predetermined values.

9. A synchronous rotor for an alternating current motor constructed and designed to be capable of automatically starting into rotation only at certain definite values of voltage and frequency of said current.

10. In a self-starting synchronous motor, means for producing a rotating magnetic field, a rotor comprising a substantially thin hardened steel piece arranged with its edges in a substantially axial plane in said field and responsive to predetermined values of voltage and frequency of the current employed for producing said field, to oscillate in starting and then to rotate continuously in one direction.

11. In a self-starting synchronous motor, a stator having an exciting coil and means for producing a rotating magnetic field, and a rotor capable of being oscillated in starting and after starting of being rotated continuously in one direction and responsive to a definite relation between the strength of the magnetism flowing through the exciting coil and the frequency of the alternating current.

12. A self-starting alternating current synchronous motor comprising a stator provided with an alternating current exciting winding, and a polar rotor oscillating in the field of said stator with a frequency resonant to the frequency of said alternating current.

13. A self-starting alternating current synchronous motor provided with means for producing a rotating magnetic field and with a rotor having a free period of vibration resonant to the frequency of the alternating current supplied to said motor to create said field.

In testimony whereof, I have signed my name to this specification.

HENRY E. WARREN.